(12) United States Patent
Bu

(10) Patent No.: US 6,873,660 B2
(45) Date of Patent: Mar. 29, 2005

(54) HIGH BANDWIDTH LOW POWER DIFFERENTIAL TRANSMITTER

(75) Inventor: Lin-kai Bu, Tainan (TW)

(73) Assignee: Himax Technologies, Inc., Tainan Hsien (TW)

( * ) Notice: Subject to any disclaimer, the term of this patent is extended or adjusted under 35 U.S.C. 154(b) by 858 days.

(21) Appl. No.: 09/847,306

(22) Filed: May 3, 2001

(65) Prior Publication Data

US 2002/0131519 A1 Sep. 19, 2002

(30) Foreign Application Priority Data

Mar. 15, 2001 (TW) .......................... 90106145 A

(51) Int. Cl.⁷ .......................... H04L 25/00; H03K 17/16
(52) U.S. Cl. .......................... 375/257; 375/295; 326/30; 326/21
(58) Field of Search .......................... 375/257, 295; 326/21–34, 62; 327/108

(56) References Cited

U.S. PATENT DOCUMENTS

| | | | |
|---|---|---|---|
| 5,285,477 A | * | 2/1994 | Leonowich .................. 375/257 |
| 5,519,728 A | | 5/1996 | Kuo |
| 5,694,060 A | | 12/1997 | Brunt et al. |
| 5,767,699 A | * | 6/1998 | Bosnyak et al. ............... 326/86 |
| 5,959,472 A | * | 9/1999 | Nagamatsu et al. ........ 327/108 |
| 6,111,431 A | * | 8/2000 | Estrada ........................ 326/83 |
| 6,201,405 B1 | * | 3/2001 | Hedberg ...................... 326/30 |
| 6,222,388 B1 | * | 4/2001 | Bridgewater, Jr. ........... 326/86 |
| 6,288,581 B1 | * | 9/2001 | Wong ........................ 327/108 |

* cited by examiner

Primary Examiner—Stephen Chin
Assistant Examiner—Jason M. Perilla
(74) Attorney, Agent, or Firm—Birch, Stewart, Kolasch & Birch, LLP

(57) ABSTRACT

A data transmitter for converting single-ended data to differential data has the advantages of energy saving, being able to precisely control the common-mode level, and being wide in operational frequency width. An NMOS transistor is employed as a source follower to provide current flowing to conduction paths, and a PMOS transistor is also employed as another source follower to discharge the current of the conduction paths.

6 Claims, 7 Drawing Sheets

US 6,873,660 B2

HIGH BANDWIDTH LOW POWER DIFFERENTIAL TRANSMITTER

This application claims priority to Taiwanese Application No. 90106145, filed Mar. 15, 2001.

BACKGROUND OF THE INVENTION (a) Field of the Invention

The invention relates to a data transmitter for delivering data to a transmission line, and in particular, to a differential data transmitter having the advantages of energy saving, being able to precisely control the common-mode level, and being wide in operational frequency width.

(b) Description of the Prior Art

Data transmission lines and buses are used for transferring data between computer components and other digital data systems. Although generally the data processed by the computer components is in a single-ended form, i.e., "high" or "low", differential transmission lines are generally employed to transmit data between the CPU and other computer components. The reason is that single-ended lines are subject to the influence of common mode noise while differential transmission lines are not. To state in detail, the data are denoted by the voltage differential between two lines in a differential transmission lines system, and the voltage differential remains the same when both lines are subjected to external influences.

If single-ended data is to be transmitted by means of differential transmission lines, a data transmitter is needed to convert the single-ended data to differential data, and at the receiving end, a data receiver is needed to convert the data from differential to single-ended form.

FIG. 6 shows a data transmitter disclosed in U.S. Pat. No. 5,694,060. As shown in FIG. 6, the transmitter includes a first and a second conduction paths connected in parallel between a node A and a node B; switches 61, 62 connected in series in the first conduction path, wherein the switch 61 is located near node A, while the switch 62 is located near node B; switches 63, 64 connected in series in the second conduction path, wherein the switch 63 is located near node A, while the switch 64 is located near node B; a fixed current source 65 for providing current to the first and second conduction paths via node A; and a fixed current source 66 for receiving current from the first and the second conduction paths via node B.

The switches 61, 62, 63, 64 respectively receive the input single-ended binary signal or its reverse direction signal such that when the switches 61 and 64 are turned on, the switches 62 and 63 are cut off, and turned on vice versa. The differential binary output signal is pulled out by node C and node D.

By comparing this data transmitter with the conventional one, although there is an improvement in energy saving, there are still some drawbacks as follows:

(1) Difficulty in Controlling Common-Mode Level

As the voltage drop of the fixed current source cannot be controlled, the voltage of node A and B cannot be determined either, thereby, the common-mode level is difficult to control.

(2) The externally connected resistance (100Ω) decides the width of the operational frequency of the data transmitter, and there is room to upgrade the operational frequency. As the fixed current sources 65, 66 possess very high output resistance, the width of the operational frequency of the data transmitter depends on the externally connected resistance (100Ω) of the transmission line. The width of operational frequency is inversely proportional to $R_{eq} \times C$, wherein $R_{eq}$ denotes the observed equivalent resistance from the transmission line to the data transmitter, and C denotes the capacitance of the transmission lines.

FIG. 7 shown a data transmitter disclosed in U.S. Pat. No. 5,519,728. As shown in FIG. 7, the data transmitter includes a first and a second conduction paths connected in parallel between node A and node B; switches 71, 72 connected in series in the first conduction path, wherein and the switch 71 is located near node A while the switch 72 is located near node B; switches 73, 74 connected in parallel in the second conduction path, wherein the switch 73 is located near node A while the switch 74 is located near node B; a fixed current source 75 for supplying current to the first and the second conduction paths via node A; and a resistor $R_B$ for receiving current from the first and the second conduction paths via node B, wherein the switches 71, 72, 73, 74 are respectively receiving the input single-ended binary signal or the reverse direction signal thereof such that when the switches 71 and 74 are turned on, the switches 72 and 73 are cut off; and vice versa. The differential binary output signal is pulled out by node C and node D.

By comparing this data transmitter with the one shown in FIG. 6, a resistor $R_B$ is employed between node B and ground point to replace a fixed current source. As a result, the voltage at node B is determined by the magnitude of the current of the fixed current source 75 and the resistance of the resistor RB determine. Therefore, the drawback of being difficult in controlling common-mode level of circuit of FIG. 6 is overcome. However, since the resistance of the resistor $R_B$ is normally much greater than the resistance (100Ω) of the externally connected transmission lines, the width of the operational frequency of the data transmitter is still determined by the resistance (100Ω) of the externally connected transmission lines.

SUMMARY OF THE INVENTION

In view of the above problems, the invention provides a differential data transmitter having features in energy saving, being able to precisely control the common-mode level and having wide width of operational frequency.

In accordance with a first preferred embodiments, the data transmitter for receiving a single-ended binary input signal and converting the single-ended binary signal to a differential binary output signal, the data transmitter comprising a first and a second conduction paths connected in parallel between a first and a second nodes; a first and a second switches connected in series in the first conduction path, the first switch being located near the first node, and the second swicth being located near the second node. A third and a forth switches connected in series in the second conduction path, the third switch being located near the first node, and the fourth switch being located near the second node; NMOS transistor being a source follower having a drain connected to voltage source, a gate connected to a first driving voltage, a source connected to the first node, for providing current to the first and the second conduction paths via the first node; and PMOS transistor being a source follower having a drain connected to the ground, a gate connected to a second driving voltage, a source connected to the second node for receiving current from the first and the second conduction paths via the second node; wherein the press-control terminals of the first switch, the second switch, the third switch and the fourth switch are respectively provided with the single-ended binary input signal or the reverse direction signal thereof for cutting off the second and the third switches when the first and the fourth switches are turned on, and for cutting off the first and the fourth switches when the second and the third switches are turned on; the differential binary output signal is pulled out by a pair of output terminals, one output terminal being connected to the connection area of the first and the second switches within the first conduction path, the other output terminal being connected to the connection area of the third and the fourth switches within the second conduction path.

A second preferred embodiment of the invention is to provide a data transmitter for receiving a single-ended binary input signal and converting the single-ended binary signal to a differential binary output signal, the data transmitter comprising a first and a second conduction paths connected in parallel between a first and a second nodes; a first and a second switches connected in series in the first conduction path, the first switch being located near the first node, and the second switch being located near the second node. A third and a forth switches connected in series in the second conduction path, the third switch being located near the first node, and the fourth switch being located near the second node; npn transistor being an emitter follower having a collector connected to voltage source, a base connected to a first driving voltage, an emitter connected to the first node for providing current to the first and the second conduction paths via the first node; and pnp transistor being an emitter follower having a collector connected to the ground, a base connected to the second driving voltage, an emitter connected to a second node for receiving current from the first and the second conduction paths via the second node; wherein the press-control terminals of the first switch, the second switch, the third switch and the fourth switch are respectively provided with the single-ended binary input signal or the reverse direction signal thereof for cutting off the second and the third switches when the first and the fourth switches are turned on, and for cutting off the first and the fourth switches when the second and the third switches are turned on; the differential binary output signal is pulled out by a pair of output terminals, one output terminal being connected to the connection area of the first and the second switches within the first conduction path, the other output terminal being connected to the connection area of the third and the fourth switches within the second conduction path.

Other object and advantages of the invention will become more apparent from the following description taken in conjunction with the accompanying drawing.

DETAILED DESCRIPTION OF THE INVENTION

Figure 1:
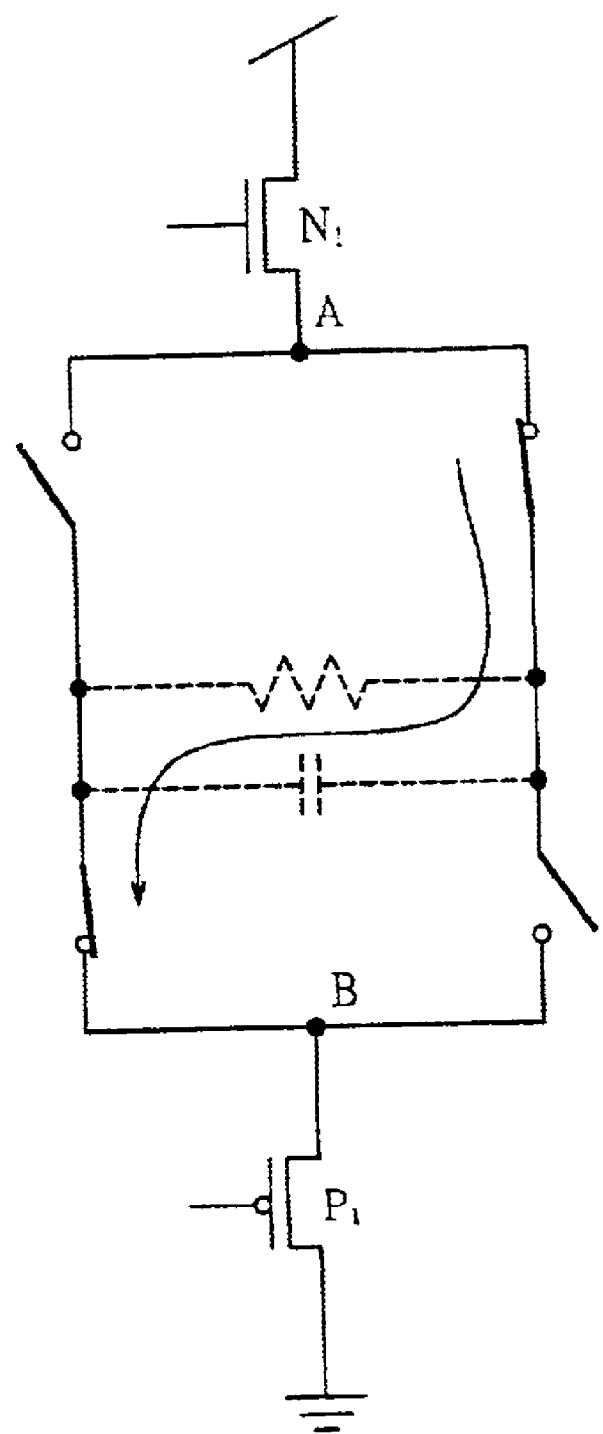
FIG. 1 shows the first preferred embodiment of the data transmitter of the invention.
Figure 7:
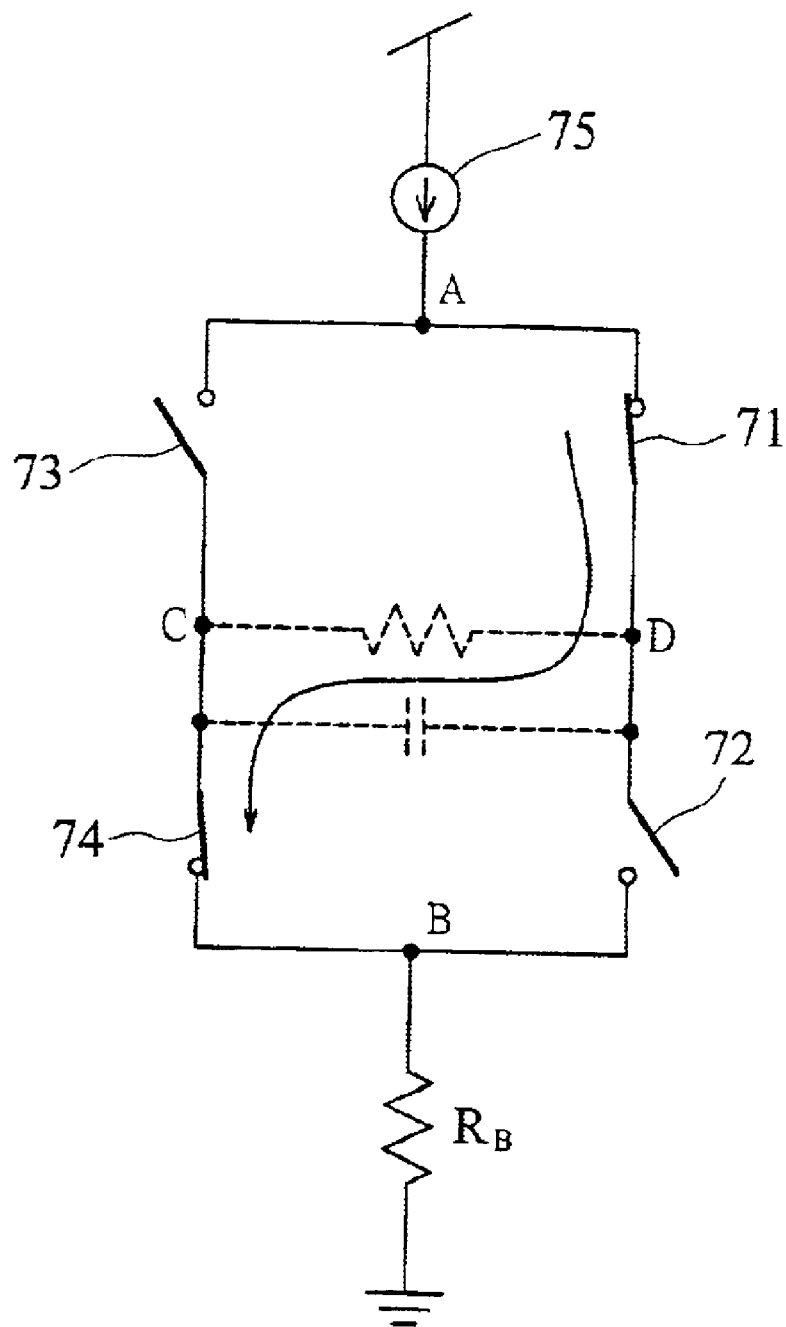
FIG. 7 is another conventional data transmitter.

Referring to the figures, FIG. 1 shows the data transmitter of the first preferred embodiment of the invention. As compared with the conventional data transmitter depicted in FIG. 7, the differences are (1) In the data transmitter of FIG. 7, the current flowing to node A is supplied from a fixed current source, and that in FIG. 1, the current flowing to node A is supplied from NMOS transistor N1 being the source follower;

(2) In the data transmitter of FIG. 7, the current flowing out from node B is flowing to a resistor $R_B$, and that in FIG. 1, the current flowing out from node B is flowing to PMOS transistor P1 being the source follower.

The data transmitter of both FIG. 1 of the invention and FIG. 7 of the conventional art with respect to high frequency operation is described hereinafter.

Referring to FIG. 7, due to the fact that the current source possesses an extremely high output resistance, and the resistance of the resistor $R_B$ is generally far larger than the resistance (100Ω) of the externally connected transmission line of the data transmitter. Thus, the width of the operational frequency of the data transmitter of FIG. 7 is dependent on the resistance (100Ω) of the externally connected transmission line (inversely proportional to Req×C, wherein $R_{eq}$ denotes the equivalent resistance observed from the transmission line to the data transmitter, C denotes the capacitance of the transmission line). In FIG. 1, the source follower N1 or P1 generally possesses a low output resistance, and after the low output resistance and the resistance 100Ω of the transmission line are connected in parallel, an equivalent resistance lower than 100Ω is obtained. This indicates that the data emitter of FIG. 1 of the invention can be operated at a higher frequency than that of the data transmitter of FIG. 7.

Besides, with respect to the properties of MOS transistor, when NMOS transistor is operating under saturation region, the following equation is established:

$$I_D = K(V_{GS} - V_t)^2$$

wherein $i_D$ denotes the current flowing through NMOS transistor, $V_{GS}$ the voltage differential between the gate and source, $V_t$ denotes the threshold voltage of NMOS and generally equals 0.6V, K is a constant.

Based on the above equation, when the voltage at node A decreases, $V_{GS}$ becomes large. The current $i_D$ flowing to node A increases with that of Voltage $V_{GS}$ and increases approximately in a square relationship. In other words, NMOS transistor N1 in FIG. 1 provides a good driving force. This explains that the data transmitter of FIG. 1 can be operated at a very high frequency. The data transmitter of FIG. 7 is provided with the driving current by a fixed current source, and comparing with the data transmitter of FIG. 1 which is driven by NMOS transistor (current increases as the voltage increases and is approximately in a square relationship), the driving ability of the data transmitter of FIG. 7 is not comparable.

Figure 2:
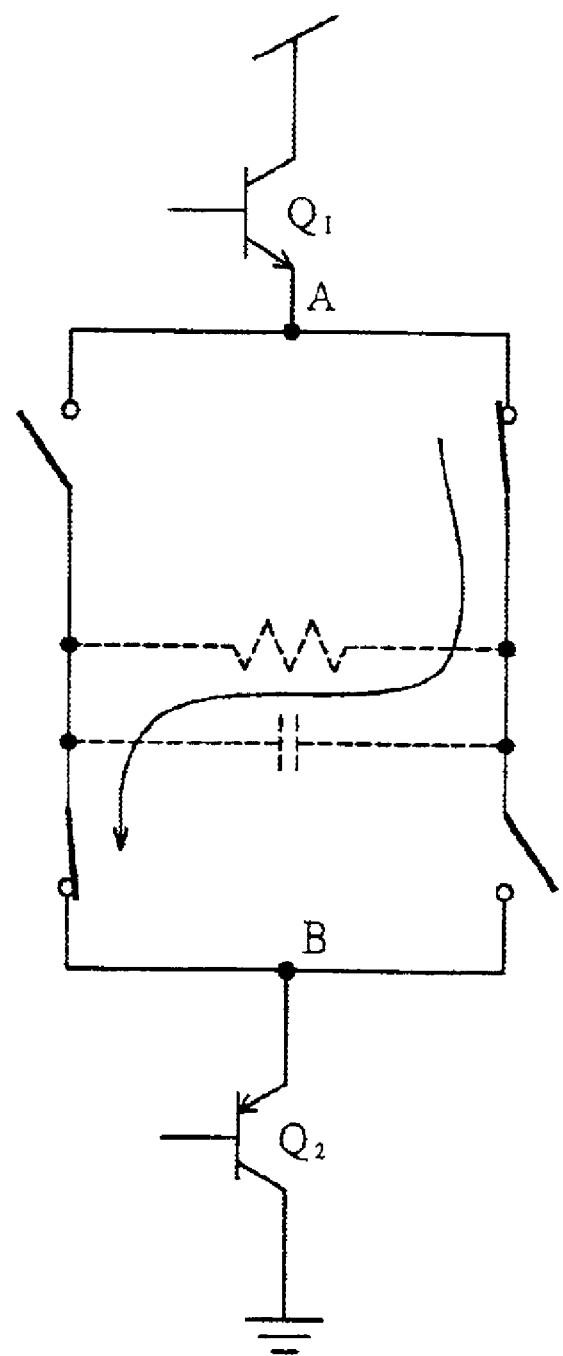
FIG. 2 shows the second preferred embodiment of the data transmitter of the invention.

FIG. 2 shows the data transmitter of the second preferred embodiment of the invention. In comparing with the circuit diagram of FIG. 1, an npn transistor Q, provides current flowing into node A and a pnp transistor Q2 is used to discharge current from node B. Based on the properties of BJT transistor, when npn transistor is operated in an active mode, the following equation is established:

$$I_E = Is' \times \exp(V_{BE}/V_T),$$

wherein $I_E$ denotes the current flowing from the emitter of BTT transistor, $V_{BE}$ denotes the voltage differential between the base and the emitter, and $V_T$ and Is' are constant. Based on the above equation, when the voltage at node A decreases, $V_{BE}$ becomes large, the current $i_E$ flowing into node A increases with the increase of voltage and in an exponential relationship. In other words, npn transistor Q, of FIG. 2 provides excellent driving force, and the operational scope of frequency is wider than that of the data transmitter of FIG. 1.

Figure 3:
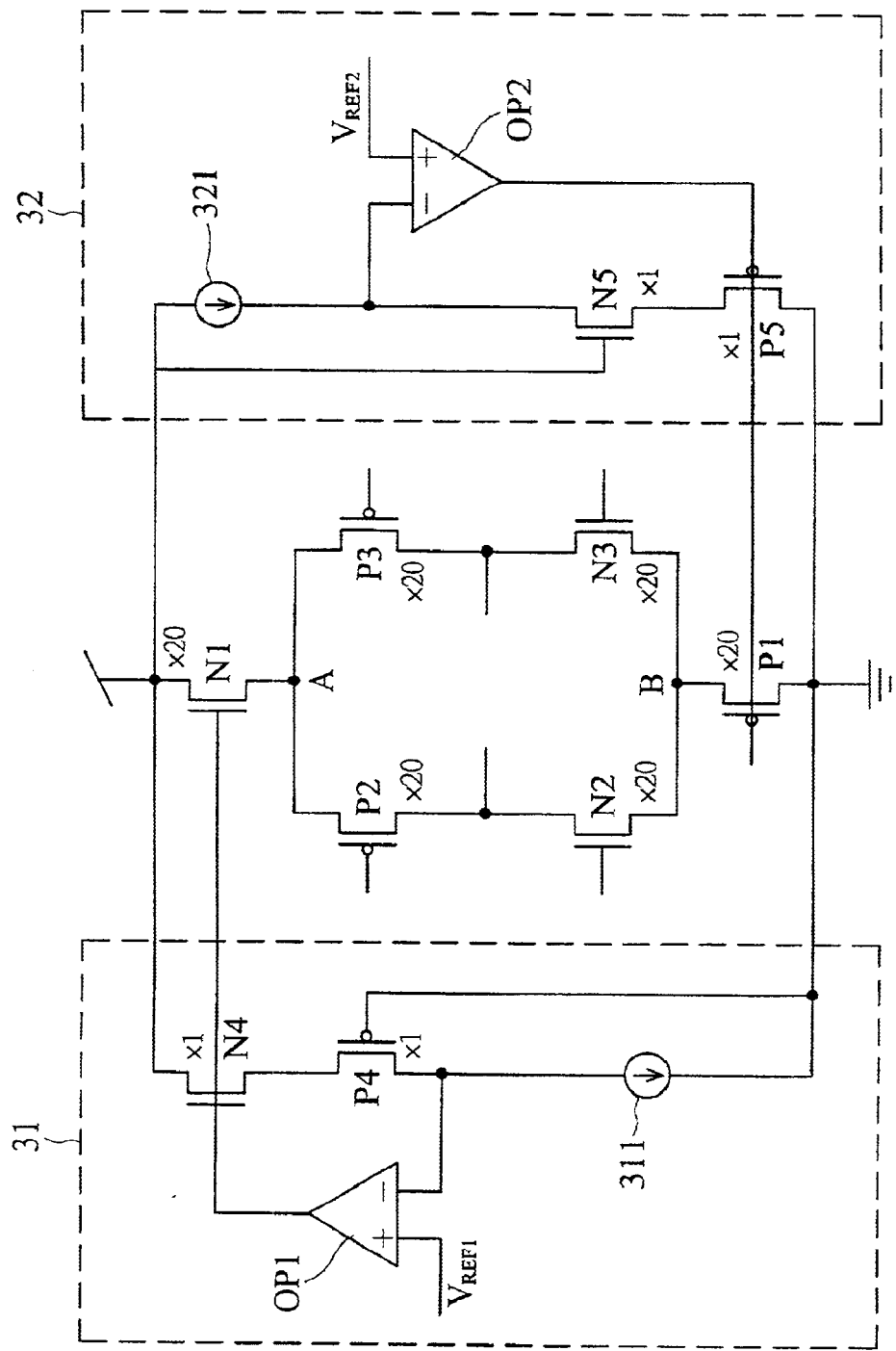
FIG. 3 shows a circuit diagram to implement the data transmitter of FIG. 1.

Referring to FIG. 3, there is shown a circuit used to implement the data transmitter. In comparison with FIG. 1, the differences are that (1) further including the driving voltage output circuit 31 to generate a driving voltage V1 to provide to NMOS transistor N1 that is used as the source follower; and the driving voltage output circuit 32 to generate a driving force V2 to provide PMOS transistor P1 that is also used as the source follower;

(2) among the four switches, two of them near node A are employed as PMOS transistors which are denoted respectively by P2, P3; another two switches near node B are employed as NMOS transistors respectively which are denoted by N2, N3.

In accordance with the invention, the application of the driving voltage output circuit 31 allows the formation of a fixed voltage at the drain of the PMOS transistor P2. On the other hand, if there is no driving voltage output circuit 31, since they are difference in manufacturing process of the individual transistors, and their characteristics are different, and if the drain of PMOS transistor P2 is to provide a fixed voltage, the voltage at the gate of NMOS transistor N1 is different in accordance with that of the transistor.

The driving voltage output circuit 31 includes NMOS transistor N4 and PMOS transistor P4 used to simulate NMOS transistor N1 and PMOS transistor P2; comparator OP1 for providing a reference voltage $V_{REF1}$ at the drain of the PMOS transistor P4 and P2; and a fixed current source 311 for providing current of the conduction paths of NMOS transistor N4 and PMOS transistor. Note that the (W/L) value of the NMOS transistor N1, and the PMOS the transistor P2 is 20 times that of the NMOS transistor N4, and the PMOS transistor P4. In other words, when the circuit of FIG. 3 is in steady state, the current flowing through NMOS transistor N4 is 1/20 times that flowing through NMOS transistor N1. For example, in order to cause the circuit to reach at steady state, the current flowing through NMOS transistor N1 is 4 mA, then the current value of the fixed current source 311 should be 200 µA. The application of the driving voltage output circuit 32 is the same as that of the driving voltage output circuit 31. Therefore, the description thereof will not be explained hereinafter.

Although the voltage of the driving voltage output circuit 31 of FIG. 3 can assure that the voltage appeared at the drain of PMOS transistor P2 is constant, since a reference voltage $V_{REF1}$ is needed to be as the input of the comparator OPI, another circuit is needed for generating reference voltage $V_{REF1}$. Moreover, an operational amplifier is needed to be used as comparator OP1, and the circuit is more complicated.

Figure 4:
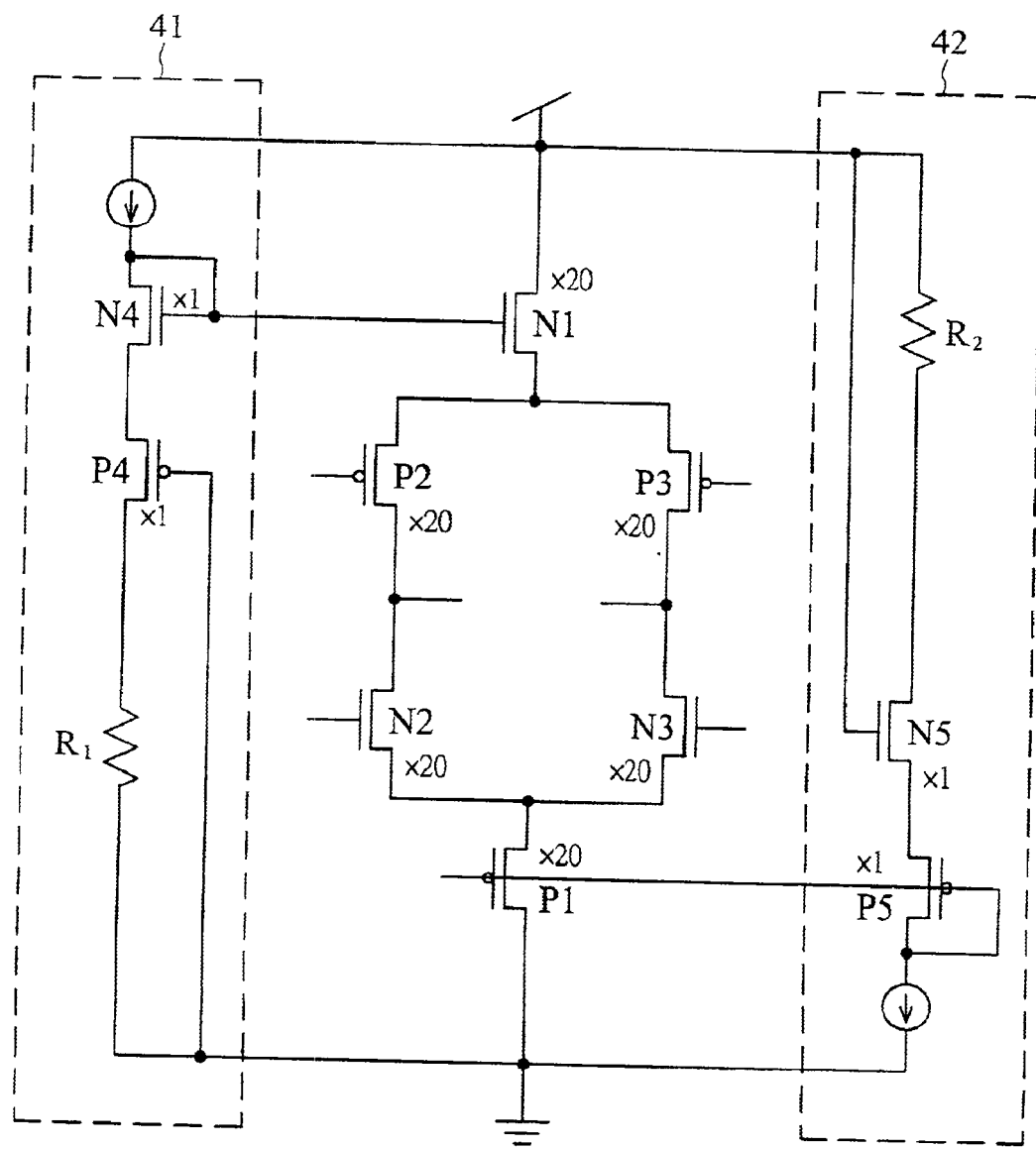
FIG. 4 shows another circuit diagram to implement the data transmitter of FIG. 1.

In view of the above-mentioned problems, FIG. 4 discloses another circuit of the data transmitter wherein driving voltage output circuits 41, 42 different from that of FIG. 3 are employed. The differences between the driving voltage output circuit 41 and the driving voltage output circuit 31 are as follows:

(1) Circuit is relatively simple—A reference voltage $V_{REF1}$ and an operational amplifier are not needed;

(2) Power margin is relatively small—As the driving voltage output circuit 41 includes the resistor R1, PMOS transistor P4, NMOS transistor and fixed current source 411 connected in series, the power margin naturally smaller than that of the driving voltage output circuit 31 constituted from the fixed current source 311, PMOS transistor P4 and NMOS transistor N4 connected in series. The application of the driving voltage output circuit 42 is the same as that of the driving voltage output circuit 41. Therefore, the description thereof will not be explained hereinafter.

Figure 5:
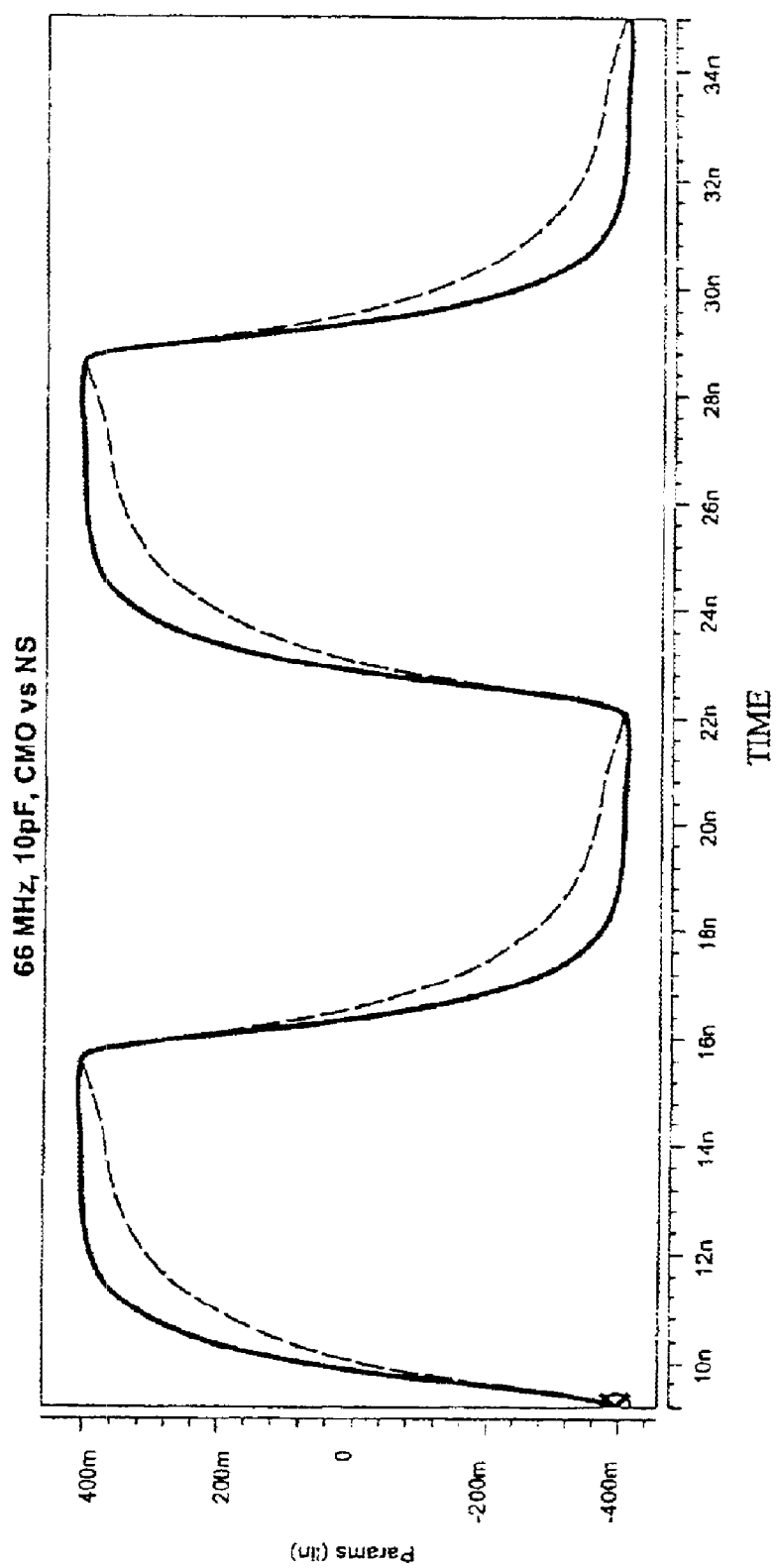
FIG. 5 is a comparative graph of a simulated experiment for the data transmitter shown in FIG. 1 and that of the conventional art shown in FIG. 7.
Figure 6:
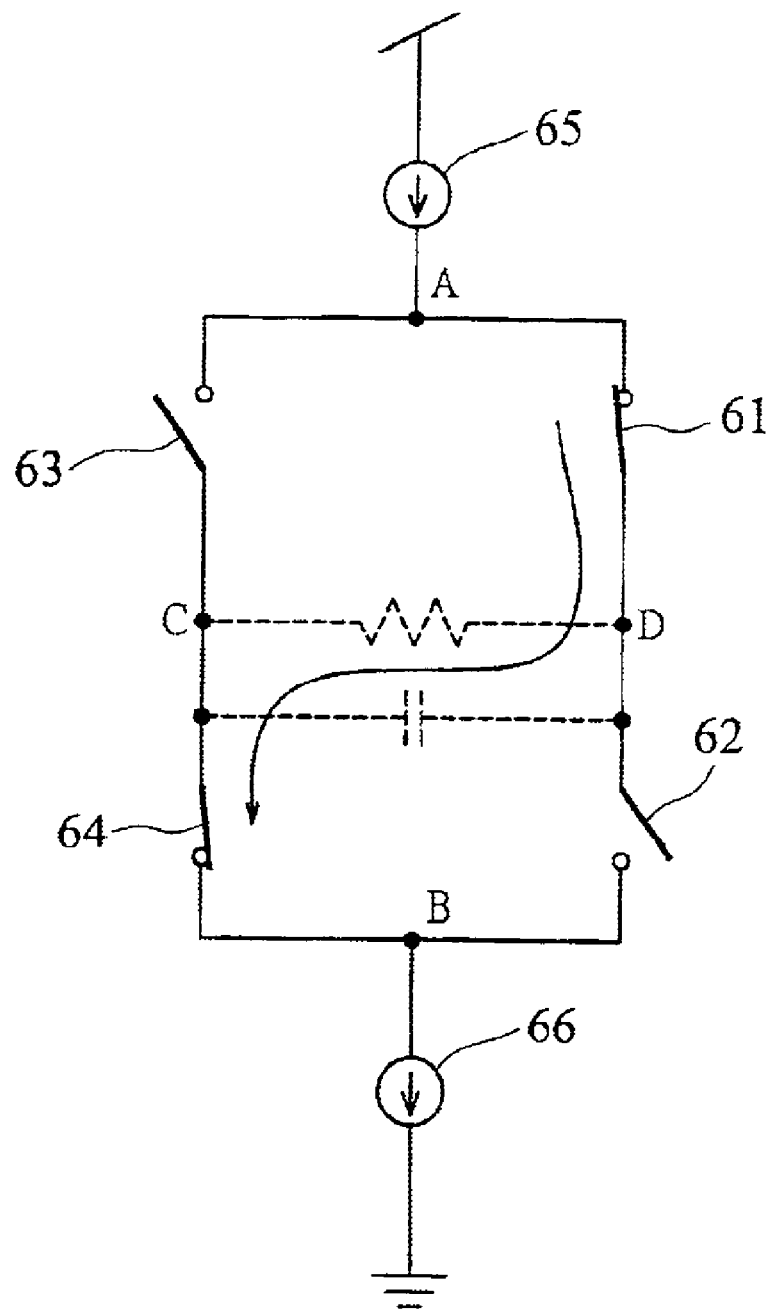
FIG. 6 is a conventional data transmitter.

FIG. 5 is comparative graph of a simulated experiment to compare the data transmitter of FIG. 1 and that of FIG. 7. The conditions of simulation experiment are as follows:

operation frequency: 66 MHz;
transmission line capacitance: 10 pF;

wherein the solid line and the dotted line respectively represent the waveform of the data emitter of the invention and that of FIG. 7.

By comparing the waveforms, it is understood that in a very short time, a steady state is attained.

The foregoing embodiments are intended to be illustrative and not limiting. Many additional and alternative embodiments in accordance with this invention will be apparent to those skilled in the art.

What is claimed is:

1. A data transmitter for receiving a single-ended binary input signal and converting the single-ended binary signal to a differential binary output signal, the data transmitter comprising:

(a) a first and a second conduction paths connected in parallel between a first and a second nodes;

(b) a first and a second switches connected in series in the first conduction path, wherein the first switch is located closer to the first node, and the second switch is located closer to the second node;

(c) a third and a fourth switches connected in series in the second conduction path, wherein the third switch is located closer to the first node, and the fourth switch is located closer to the second node;

(d) a source follower NMOS transistor having a drain connected to a voltage source, a gate connected to a first driving voltage, and a source connected to the first node, for providing current to the first and the second conduction paths via the first node; and (e) a source follower PMOS transistor having a drain connected to ground, a gate connected to a second driving voltage, a source connected to the second node for receiving current from the first and the second conduction paths via the second node;

wherein a control terminal of each of the first switch, the second switch, the third switch and the fourth switch are each provided with one of the single-ended binary input signal or the inverse signal thereof for cutting off the second and the third switches when the first and the fourth switches are turned on, and for cutting off the first and the fourth switches when the second and the third switches are turned on; the differential binary output signal pulled out by a pair of output terminals, one of the output terminals is connected between the first and the second switches within the first conduction path, while the other output terminal is connected between the third and the fourth switches within the second conduction path.

2. A data transmitter as set forth in claim 1, wherein the first and the third switches are PMOS transistor switches, and the second and the fourth switches are NMOS transistor switches, and the first driving voltage is generated by a first driving voltage output circuit, and the second driving voltage is generated by a second driving voltage output circuit, wherein the first driving voltage output circuit comprises:

(a) a first fixed current source having an output terminal connected to ground;

(b) a first NMOS transistor and a first PMOS transistor, wherein the sources of both the transistors are connected, the drain of the first NMOS transistor is connected to the voltage source, the gate of the first NMOS transistor is connected to the gate of the source follower NMOS transistor, the drain of the first PMOS transistor is connected to an input terminal of the first fixed current source, and the gate of the first PMOS transistor is connected to ground; and (c) a first comparator having a positive input terminal connected to a first reference voltage, a negative input terminal connected to the input terminal of the first fixed current source, and an output terminal being connected to the gate of the first NMOS transistor; and wherein the second driving voltage output circuit comprises:

(d) a second fixed current source having an input terminal connected to the voltage source;

(e) a second NMOS transistor and a second PMOS transistor, wherein the sources of both the transistors are connected, the drain of the second PMOS transistor is connected to ground; the gate of the second PMOS transistor is connected to the gate of the source follower PMOS transistor; the drain of the second NMOS transistor is connected to an output terminal of the second fixed current source, and the gate of the second NMOS transistor is connected to the voltage source; and (f) a second comparator having a positive input terminal for receiving a second reference voltage, and a negative input terminal connected to the output terminal of the second fixed current source, and an output terminal connected to the gate of the second PMOS transistor.

3. A data transmitter as set forth in claim 1, wherein the first and the third switches are PMOS transistor switches, and the second and the fourth switches are NMOS transistor switches, and the first driving voltage is generated by a first driving voltage output circuit, and the second driving voltage is generated by a second driving voltage output circuit, wherein the first driving voltage output circuit comprises:

(a) a first fixed current source having an input terminal connected to the voltage source;

(b) a first resistor having a first terminal connected to ground; and (c) a first NMOS transistor and a first PMOS transistor, wherein the sources of both the transistors are connected, the drain of the first NMOS transistor is connected to the gate of the first NMOS transistor and an output terminal of the first fixed current source, the gate of the first NMOS transistor is connected to the gate of the source follower NMOS transistor, the drain of the first PMOS transistor is connected to a second terminal of the resistor, and the gate of the first PMOS transistor is connected to group; and wherein the second driving voltage output circuit comprises:

(d) a second fixed current source having an output terminal connected to ground;

(e) a second resistor having a first terminal connected to the voltage source; and (f) a second NMOS transistor and a second PMOS transistor, wherein the sources of both the transistors are connected, the drain of the second PMOS transistor is connected to the gate of the second PMOS transistor and an input terminal of the second fixed current source, the gate of the second PMOS transistor is connected to the gate of the source follower PMOS transistor, the drain of the second NMOS transistor is connected to a second terminal of the resistor, and the gate of the second NMOS transistor is connected to the voltage source.

4. A data transmitter for receiving a single-ended binary input signal and converting the single-ended binary signal to a differential binary output signal, the data transmitter comprising:

(a) a first and a second conduction paths connected in parallel between a first and a second nodes;

(b) a first and a second switches connected in series in the first conduction path, wherein the first switch is located closer to the first node, and the second switch is located closer to the second node;

(c) a third and a fourth switches connected in series in the second conduction path, wherein the third switch is located closer to the first node, and the fourth switch is located closer the second node;

(d) an emitter follower npn transistor having a collector connected to a voltage source, a base connected to a first driving voltage, an emitter connected to the first nodes, for providing current to the first and the second conduction paths via the first node; and (e) an emitter follower pnp transistor having a collector connected to ground, a base connected to a second driving voltage, an emitter connected to the second node for receiving current from the first and the second conduction paths via the second node;

wherein a control terminal of each of the first switch, the second switch, the third switch and the fourth switch are each provided with one of the single-ended binary input signal or the inverse signal thereof for cutting off the second and the third switches when the first and the fourth switches are turned on, and for cutting off the first and the fourth, switches when the second and the third switches are turned on; the differential binary output signal is pulled out by a pair of output terminals, wherein one of the output terminals is connected between the first and the second switches within the first conduction path, and the other output terminal is connected between the third and the fourth switches within the second conduction path.

5. A data transmitter as set forth in claim 4, wherein the first and the third switches are pnp transistor switches, and the second and the fourth switches are npn transistor switches, and the first driving voltage is generated by a first driving voltage output circuit, and the second driving voltage is generated by a second driving voltage output circuit, wherein the first driving voltage output circuit comprises:

(a) a first fixed current source having an output terminal connected to ground;

(b) a first npn transistor and a first pnp transistor, wherein the emitters of both the transistors are connected, the collector of the first npn transistor is connected to the voltage source, the base of the first non transistor is connected to the base of the emitter follower npn transistor, the collector of the first pnp transistor is connected to an input terminal of the first fixed current source, and the base of the first pnp transistor is connected to ground; and (c) a first comparator having a positive input terminal connected to a first reference voltage, a negative input terminal connected to the input terminal of the first fixed current source, and an output terminal connected to the base of the first npn transistor; and wherein the second driving voltage output circuit comprises:

(d) a second fixed current source having an input terminal connected to the voltage source;

(e) a second npn transistor and a second pnp transistor, wherein the emitters of both the transistors are connected, the collector of the second pnp transistor is connected to ground, the base of the second pnp transistor is connected to the base of the emitter follower pnp transistor, the collector of the second npn transistor is connected to an cutout terminal of the second fixed current source, and the base of the second non transistor is connected to the voltage source; and (f) a second comparator having a positive input terminal for receiving a second reference voltage, a negative input terminal connected to the output terminal of the second fixed current source, and an output terminal connected to the base of the second pnp transistor.

6. A data transmitter as set forth in claim 4, wherein the first and the third switches are pnp transistor switches, and the second and the fourth switches are npn transistor switches, and the first driving voltage is generated by a first driving voltage output circuit, and the second driving voltage is generated by a second driving voltage output circuit, wherein the first driving voltage output circuit comprises:

(a) a first fixed current source having an input terminal connected to a the voltage source;

(b) a first resistor having a first terminal connected to ground; and (c) a first npn transistor and a first pnp transistor, wherein the emitters of both the transistors are connected, the collector of the first npn transistor is connected to the base of the first npn transistor and an output terminal of the first fixed current source, the base of the first npn transistor is connected to the base of the emitter follower npn transistor, the collector of the first pnp transistor is connected to a second terminal of the resistors, and the base of the first pnp transistor is connected to ground; and wherein the second driving voltage output circuit comprises:

(d) a second fixed current source having an output terminal connected to ground;

(e) a second resistor having a first terminal connected to the voltage source; and (f) a second npn transistor and a second pnp transistor, wherein the emitters of both the transistor are connected, the collector of the second pnp transistor is connected to the base of the second pnp transistor and an input terminal of the second fixed current source, the base of the second pnp transistor is connected to the base of the emitter follower pnp transistor, the collector of the second npn transistor is connected to a second terminal of the resistor, and the base of the second npn transistor is connected to the voltage source.

* * * * *